United States Patent
Kim

(10) Patent No.: US 6,798,172 B2
(45) Date of Patent: Sep. 28, 2004

(54) METHOD FOR PRESERVING CAPACITY OF A BATTERY OF AN ELECTRONIC DEVICE

(75) Inventor: Gwang Su Kim, Chung cheong buk do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/355,007

(22) Filed: Jan. 31, 2003

(65) Prior Publication Data

US 2003/0151390 A1 Aug. 14, 2003

Related U.S. Application Data

(62) Division of application No. 09/725,475, filed on Nov. 30, 2000, now Pat. No. 6,583,604.

(30) Foreign Application Priority Data

Nov. 30, 1999 (KR) .......................................... 1999-53942

(51) Int. Cl.⁷ ................................................. H02J 7/00
(52) U.S. Cl. ..................................................... 320/132
(58) Field of Search ................................ 320/106, 110, 320/128, 132, 134, 135, 136, 133, 155, 157, 158, 159, DIG. 18

(56) References Cited

U.S. PATENT DOCUMENTS 5,136,620 A * 8/1992 Eaves
5,563,493 A * 10/1996 Matsuda et al. ............. 320/124
5,920,180 A * 7/1999 Kim ............................ 320/128
6,194,874 B1 * 2/2001 Kalageropoulos et al. .. 320/137
6,583,604 B2 * 6/2003 Kim ............................ 320/132

FOREIGN PATENT DOCUMENTS

JP          07143680          *  6/1995

* cited by examiner

Primary Examiner—Pia Tibbits
(74) Attorney, Agent, or Firm—Fleshner & Kim, LLP

(57) ABSTRACT

A battery capacity recovery apparatus and method thereof periodically conducts discharge and recharge operations for a battery used in a wireless telephone to prevent a memory effect on the battery. The battery capacity recovery apparatus includes a control unit for controlling the system of the wireless telephone, and a voltage detecting unit for measuring a voltage condition of the battery, and outputting a signal indicative of the measured voltage condition to the control unit. A recharge detecting unit is connected to a constant voltage unit and is included in a recharge device. The recharge detecting unit detects whether or not a handset unit of the telecommunication device is connected to the recharge device, and a recovery path establishing unit is adapted to establish a path for recovering the capacity of the battery under a control of the control unit.

33 Claims, 6 Drawing Sheets

METHOD FOR PRESERVING CAPACITY OF A BATTERY OF AN ELECTRONIC DEVICE

CROSS-REFERENCE TO RELATED APPLICATIONS

This application is a divisional of U.S. patent application Ser. No. 09/725,475, filed on Nov. 30, 2000 now U.S. Pat. No. 6,583,604 the contents of which are incorporated herein by reference.

BACKGROUND OF THE INVENTION

1. Field of the Invention

The present invention relates to a telecommunication system, and more particularly, a telecommunication device having a battery capacity recovery apparatus and method thereof.

2. Background of the Related Art

Generally, a wireless telephone, both cordless and mobile telephone, uses a radio link substituted for a cord typically used in landline telephones. A cordless telephone is appropriately used within a short-distance range, such as a room, and a mobile telephone is used within an intermediate or long distance range, especially when a user is at a remote location.

For such wireless telephones, one frequency or multiple frequencies may be used. As shown in FIG. 1A, if the telephone device is a cordless telephone, the handset communicates with a base unit, which includes a recharge receptacle and may include a keypad and a display, connected to a landline (dotted lines). Also, one or more handsets may be used for one base unit.

If the telephone device is a mobile telephone, the cell phone would communicate with a base station via a digital communication or an analog communication, and the base unit includes a recharge receptacle connected to an AC/DC converter. Further, one or more cellular phones would communicate with the base station.

In a conventional wireless telephone, the battery of the handset or the cellular telephone is temporarily used only when the user makes or receives a call. After the temporary use, the battery is rendered to be in a recharge state, if the telephone is placed in the recharge receptacle. Thus, discharge and recharge operations are repeatedly carried out for the battery.

FIG. 1B is a block diagram illustrating the configuration of a related art wireless telephone associated with a recharge device. In the related art wireless telephone, the base unit includes a constant voltage generating unit 1 incorporated in a recharge device.

The handset or the cellular phone includes (hereinafter, collectively referred to as handset unit) a recharge detecting unit 2 for detecting whether or not a handset unit is connected to the constant voltage generating unit 1 of the recharge device via recharge terminals, and a control unit 3 for determining whether or not the handset unit is connected to the recharge device, based on a detect signal outputted from the recharge detecting unit 2, and for controlling a recharge function of the handset unit based on the result of the determination, and a recharge current control resistor 4 is used to control a recharge current supplied to a battery 5 via the recharge terminals. The battery 5 is incorporated in the handset unit and recharged with a constant voltage supplied from the constant voltage generating unit 1.

Now, the charge operation of the related art wireless telephone having the above mentioned configuration will be described in detail. Where it is desired to recharge the battery 5 of the handset unit, the handset unit is first connected to the recharge terminals of the recharge device. In this state, the handset unit is connected to the constant voltage unit 1 of the recharge device, thereby causing a constant voltage to be supplied from the constant voltage unit 1 to the handset unit. A current is introduced into the battery 5 via the recharge current control resistor 4, thereby causing the battery 5 to be recharged with a constant voltage.

The recharge detecting unit 2 incorporated in the handset unit detects whether or not the handset unit is connected to the recharge device, and informs the control unit 3 of the detection result. When the control unit 3 determines, based on the information from the recharge detecting unit 2, that the handset unit is connected to the recharge device, it conducts a control for recharging the battery 5 with a constant voltage supplied from the constant voltage generating unit 1 of the recharge device.

However, the above mentioned related art wireless telephone has a problem associated with a "memory effect" of the battery 5 generated due to the habitual use pattern of the user associated with the use of the handset unit. For example, the user typically uses the handset of the cordless telephone after taking up the handset unit from a state in which the handset is laid on the recharge device (that is, a recharge state) of the base unit. During the use, the handset is in a discharge state. After the use of the handset, the user puts the handset on the recharge device of the base unit. Due to such a habitual use pattern of the user associated with the use of the handset, a memory effect is involved in the battery 5.

Users who have a technical knowledge about a memory effect on batteries may reduce, to some degree, the problem associated with the memory effect by appropriately controlling the use pattern for wireless telephones. However, most users repeat discharge and recharge operations for a battery without discharging the battery to a deep discharge state. For this reason, the battery has a capacity portion substantially unused. This capacity portion is gradually inactivated, so that it cannot be used. As a result, the battery has a reduced capacity corresponding to the capacity portion subjected to discharge and recharge operations. That is, a memory effect is generated. A similar effect occurs for mobile telephones when a user repeatedly recharges the battery without fully depleting the battery.

This memory effect results in a considerable reduction in the standby time or use time of the handset unit. The degradation resulting from such a memory effect occurs more frequently, as compared to those resulting from other factors.

SUMMARY OF THE INVENTION

An object of the invention is to solve at least the above problems and/or disadvantages and to provide at least the advantages described hereinafter.

An object of the invention is to provide a battery capacity recovery apparatus and method for periodically conducting discharge and recharge operations for a battery used in a wireless telephone to prevent a memory effect on the battery, thereby being capable of reducing the battery degradation while maximizing the convenience of the user.

In accordance with one aspect, the present invention provides in a system including a recharge device for recharging a battery, and an operating device adapted to use a voltage supplied from the battery, a battery capacity recovery apparatus comprising: a control unit for controlling the system; a voltage detecting unit for measuring a voltage condition of the battery, and outputting a signal indicative of the measured voltage condition to the control unit; a recharge detecting unit connected to a constant voltage unit included in the recharge device, the recharge detecting unit serving to detect whether or not the operating device is connected to the recharge device; and a recovery path establishing unit adapted to establish a path for recovering the capacity of the battery under a control of the control unit.

In accordance with another aspect, the present invention provides in a system including a recharge device for recharging a battery, and an operating device adapted to use a voltage supplied from the battery, a battery capacity recovery method comprising the steps of: setting a reference voltage for the battery; connecting the operating device to the recharge device; detecting a voltage of the battery; determining whether or not an operation for recovering the capacity of the battery is to be executed; determining whether or not the detected battery voltage is not less than the reference voltage; and executing a recharge or discharge operation, based on the results of the determinations.

The battery capacity recovery apparatus and method can prevent a memory effect more frequently resulting in a battery degradation, as compared to those resulting from other factors. Accordingly, it is possible to reduce the battery degradation while maximizing the convenience of the user.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1A:
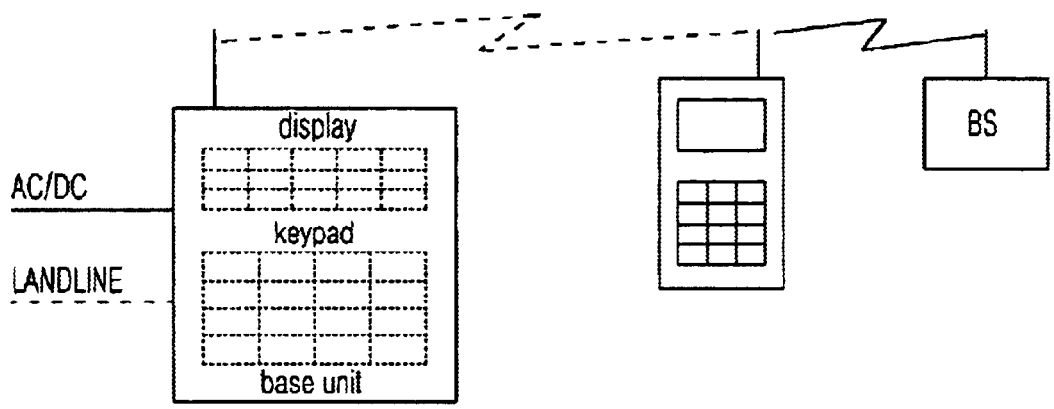
FIG. 1A is a block diagram of a cordless telephone system and a mobile telephone system.
Figure 1B:
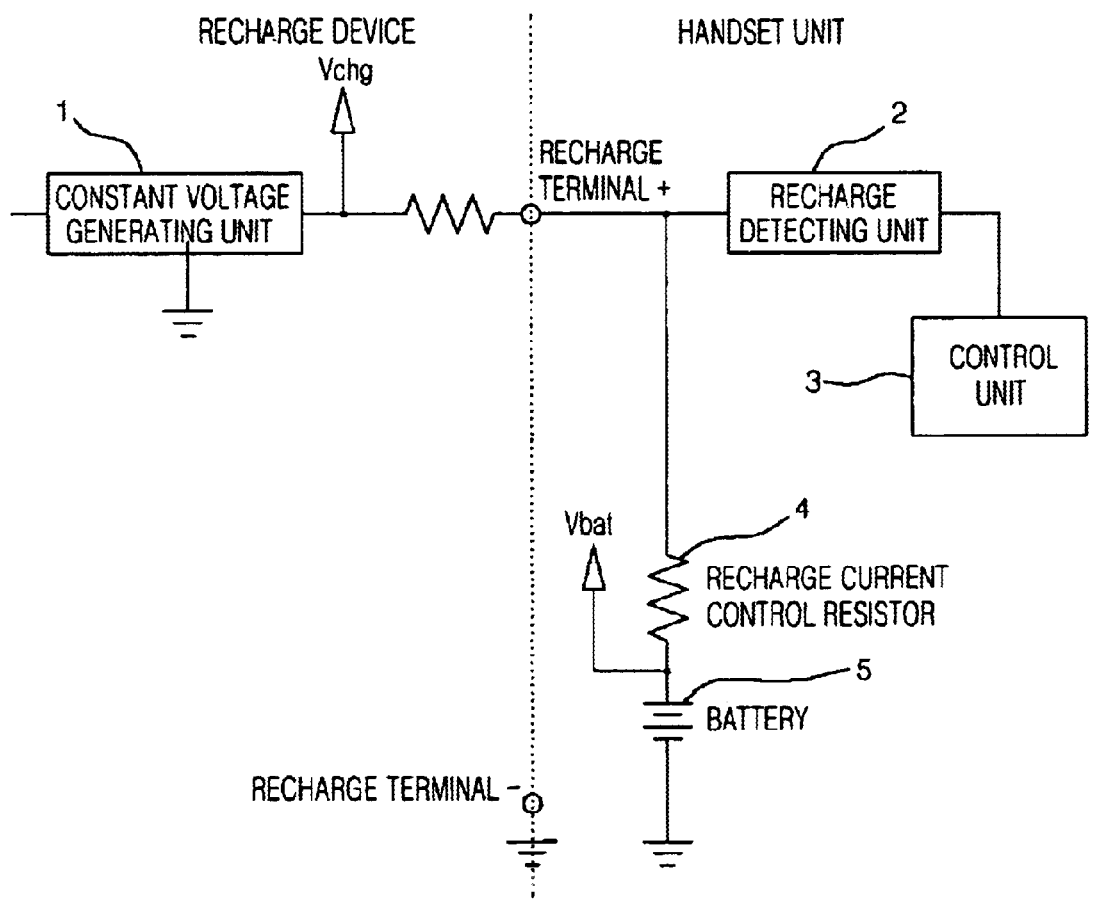
FIG. 1B is a block diagram illustrating the configuration of a conventional wireless telephone associated with a recharge device.
Figure 2:
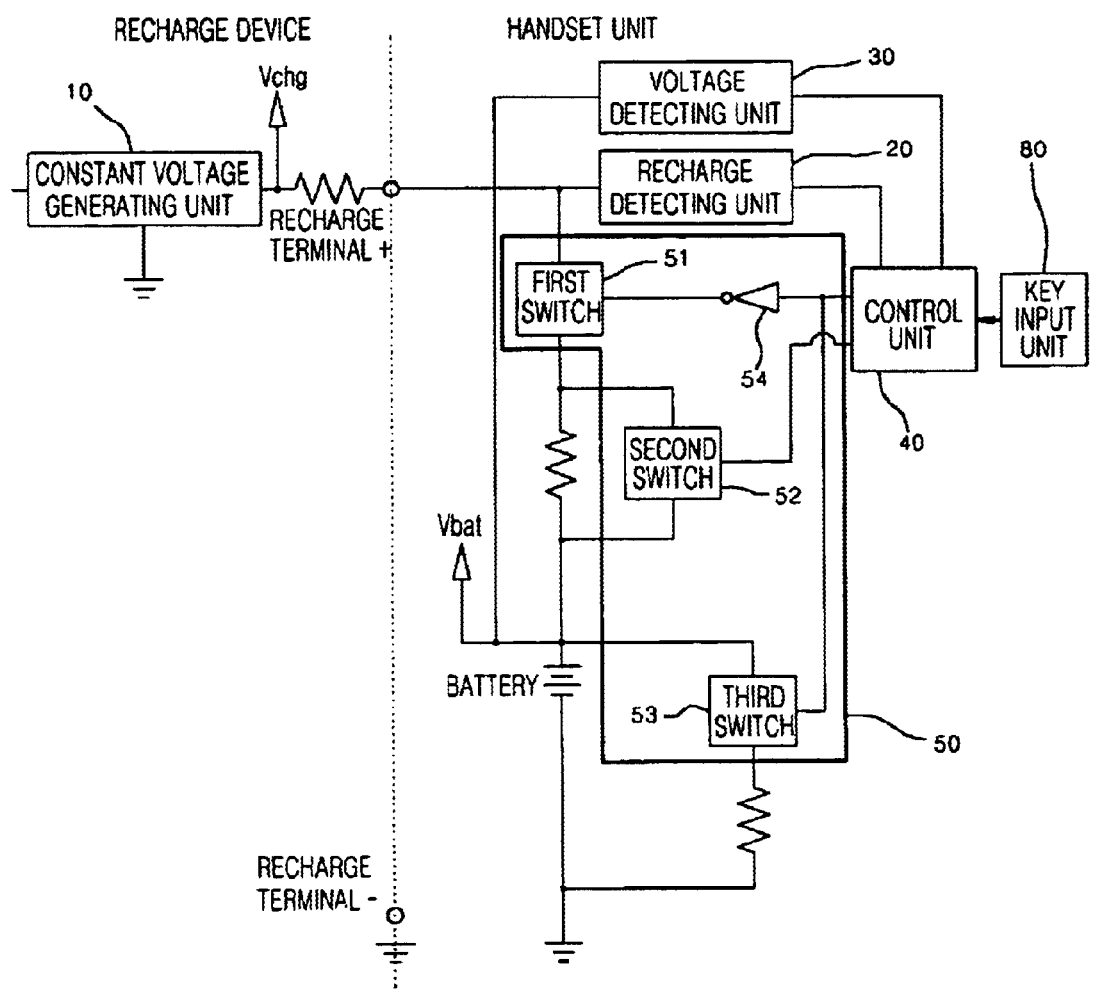
FIG. 2 is a block diagram illustrating a battery capacity recovery apparatus of a wireless telephone according to an embodiment of the present invention.

FIG. 2 is a block diagram illustrating a battery capacity recovery apparatus of a telecommunication device according to an embodiment of the present invention. A constant voltage generating unit 10 is incorporated in a recharge device installed in a base unit. A recharge detecting unit 20 for detecting whether or not a handset unit is connected to the constant voltage generating unit 1 of the recharge device via recharge terminals, i.e., whether or not the handset unit is in a recharge state.

A voltage detecting unit 30 measures the voltage condition of a battery incorporated in the handset unit, and informs a control unit 40 of the measured voltage condition. The control unit 40, which is included in the battery capacity recovery apparatus, controls a recovery path establishing unit 50, based on a signal received from the voltage detecting unit 30 and indicative of the measured voltage condition, while controlling the system of a telecommunication device to which the battery capacity recovery apparatus is applied.

The recovery path establishing unit 50, which is also included in the battery capacity recovery apparatus, establishes a path for recovering the battery under the control of the control unit 40. The recovery path establishing unit 50 includes a first switch 51 for establishing a recharge path between a recharge terminal and the battery via a recharge current control resistor under the control of the control unit 40. A second switch 52 establishes a recharge path between the first switch 51 and the battery under the control of the control unit 40 in order to allow a rapid recharge operation to be conducted, and a third switch 53 connects the battery to the ground under the control of the control unit 40, thereby establishing a forced discharge path.

The recovery path establishing unit 50 also includes an inverter 54 for controlling recharge and discharge operations to be conducted separately from each other under the control of the control unit 40. The inverter 54 receives a control signal from the control unit 40, and transmits a signal inverted from the received control signal to the first switch 51. By virtue of this function of the inverter 54, when a recharge operation is conducted in an ON state of the first switch 51, the third switch 53 is in its OFF state, thereby preventing a discharge operation from being conducted. In an OFF state of the first switch 51, the third switch 53 is in its ON state, so that the discharge operation is carried out.

Figure 3:
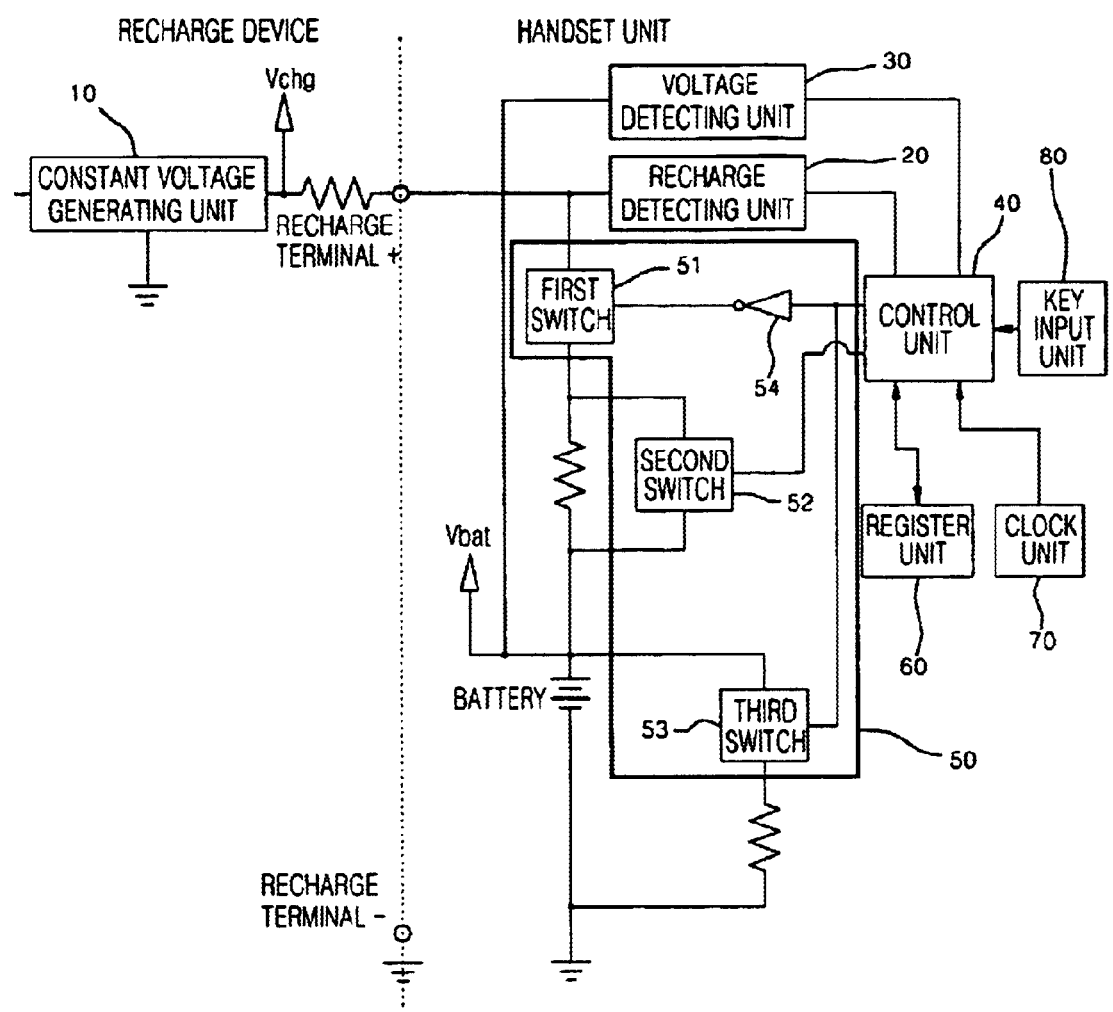
FIG. 3 is a block diagram illustrating a battery capacity recovery apparatus of a wireless telephone according to another embodiment of the present invention.

FIG. 3 is a block diagram illustrating a battery capacity recovery apparatus of a telecommunication device according to another embodiment of the present invention. In FIG. 3, elements respectively corresponding to those in FIG. 2 are denoted by the same reference numerals. A constant voltage generating unit 10 is incorporated in a recharge device installed in a base unit, a recharge detecting unit 20 detects whether or not a handset unit is connected to the constant voltage generating unit 1 of the recharge device via recharge terminals, i.e., whether or not the handset unit is in a recharge state, and a voltage detecting unit 30 for measuring the voltage condition of a battery incorporated in the handset unit, and informing a control unit 40 of the measured voltage condition.

The control unit 40, which is included in the battery capacity recovery apparatus, controls the recharge function of a wireless telephone, to which the battery capacity recovery apparatus is applied, based on the result of the measurement conducted by the recharge detecting unit 30. The control unit 40 also controls a recovery path establishing unit 50 and the system of the wireless telephone, based on a signal received from the voltage detecting unit 30 and indicative of the measured voltage condition.

The recovery path establishing unit 50, which is also included in the battery capacity recovery apparatus, establishes a path for recovering the battery under the control of the control unit 40. The battery capacity recovery apparatus further includes a register unit 60 for counting the number of detection times conducted by the recharge detecting unit 20. The register unit 60 also cumulatively stores the counted value, and a clock unit 70 generates a reference clock for a timing control of the control unit 40. A key input unit 80 is connected to the control unit 40 and adapted to input, to the control unit 40, key signals for setting an initial time and the current time.

The recovery path establishing unit 50 includes a first switch 51 for establishing a recharge path between a recharge terminal and the battery via a recharge current control resistor under the control of the control unit 40. A second switch 52 establishes a recharge path between the first switch 51 and the battery under the control of the control unit 40 in order to allow a rapid recharge operation to be conducted, and a third switch 53 connects the battery to the ground under the control of the control unit 40, thereby establishing a forced discharge path. The recovery path establishing unit 50 also includes an inverter 54 having the same function as that of FIG. 2.

Figure 4:
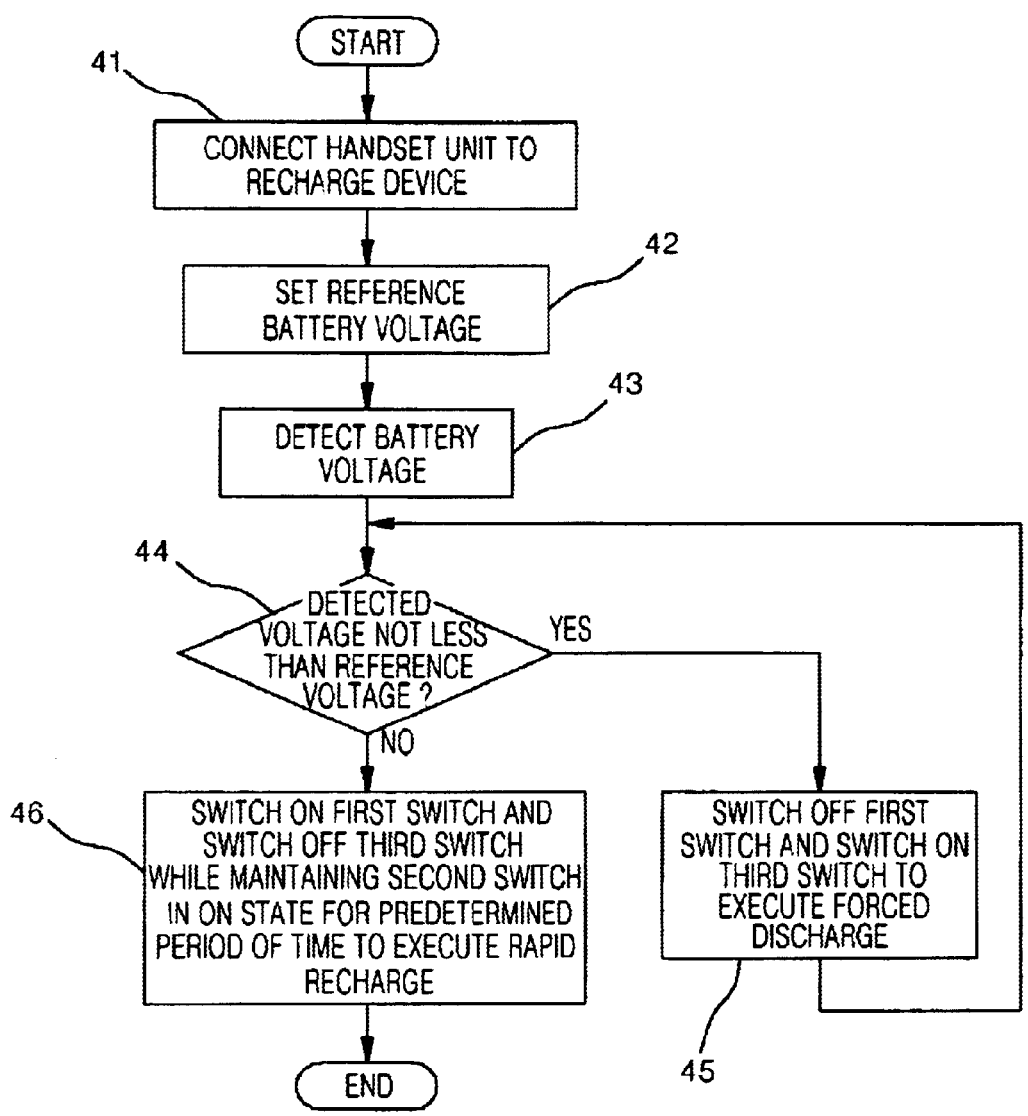
FIG. 4 is a flow chart illustrating sequential steps of a battery capacity recovery method for a wireless telephone in accordance with the present invention.

FIG. 4 is a flow chart illustrating sequential steps of a battery capacity recovery method for a telecommunication device, which is carried out using the battery capacity recovery apparatus of FIG. 2 or FIG. 3 in accordance with the present invention. The handset unit is first connected to the recharge device installed in the base unit for a recharge of the battery (Step 41). A reference voltage is then set by a minimum voltage within a voltage range having no influence on the battery (Step 42). When the voltage of the battery is detected (Step 43), it is determined whether or not the detected battery voltage is not less than the reference voltage (Step 44).

When the battery voltage is not less than the reference voltage, the procedure proceeds to step 45. At step 45, the first switch 51 is switched off, thereby preventing an establishment of the recharge path between the recharge terminals and the battery. Simultaneously, the third switch 53 is switched on, thereby causing the battery to be connected to the ground. Accordingly, the forced discharge path is established to allow a forced discharge operation to be conducted. The procedure is then returned to step 44.

On the other hand, when the battery voltage is less than the reference voltage, the procedure proceeds to step 46. At step 46, the first switch 51 is switched on, and the third switch 53 is switched off. In this state, the recharge path between the recharge terminals and the battery is established. Simultaneously, the second switch 52 is switched on, and maintained in the ON state for a predetermined period of time. Accordingly, a rapid recharge operation is conducted for the predetermined period of time. When the battery voltage, detected after the procedure returns from step 45 to step 44, is less than the reference voltage, step 46 is also executed.

After the rapid recharge operation is completed for the predetermined period of time, the second switch 52 is switched off, and a normal recharge operation is conducted through the recharge path established via the first switch 51 and the resistor. After completing step 46, the procedure is ended.

The first and third switches 51 and 53 operate in an inverted fashion with respect to each other by virtue of the inverter 54. That is, when the first switch 51 is in its ON state to conduct the recharge operation, the third switch 53 is in its OFF state. On the other hand, when the first switch 51 is in its OFF state, the third switch 53 is in its ON state to allow a discharge of the battery to be carried out.

The reference voltage, which is a minimum voltage within a voltage range having no influence on the battery, is set in order to prevent the battery from reaching a state, in which the function of the battery is down, thereby disabling a recharge of the battery, due to an excessive discharge of the battery.

Figure 5:
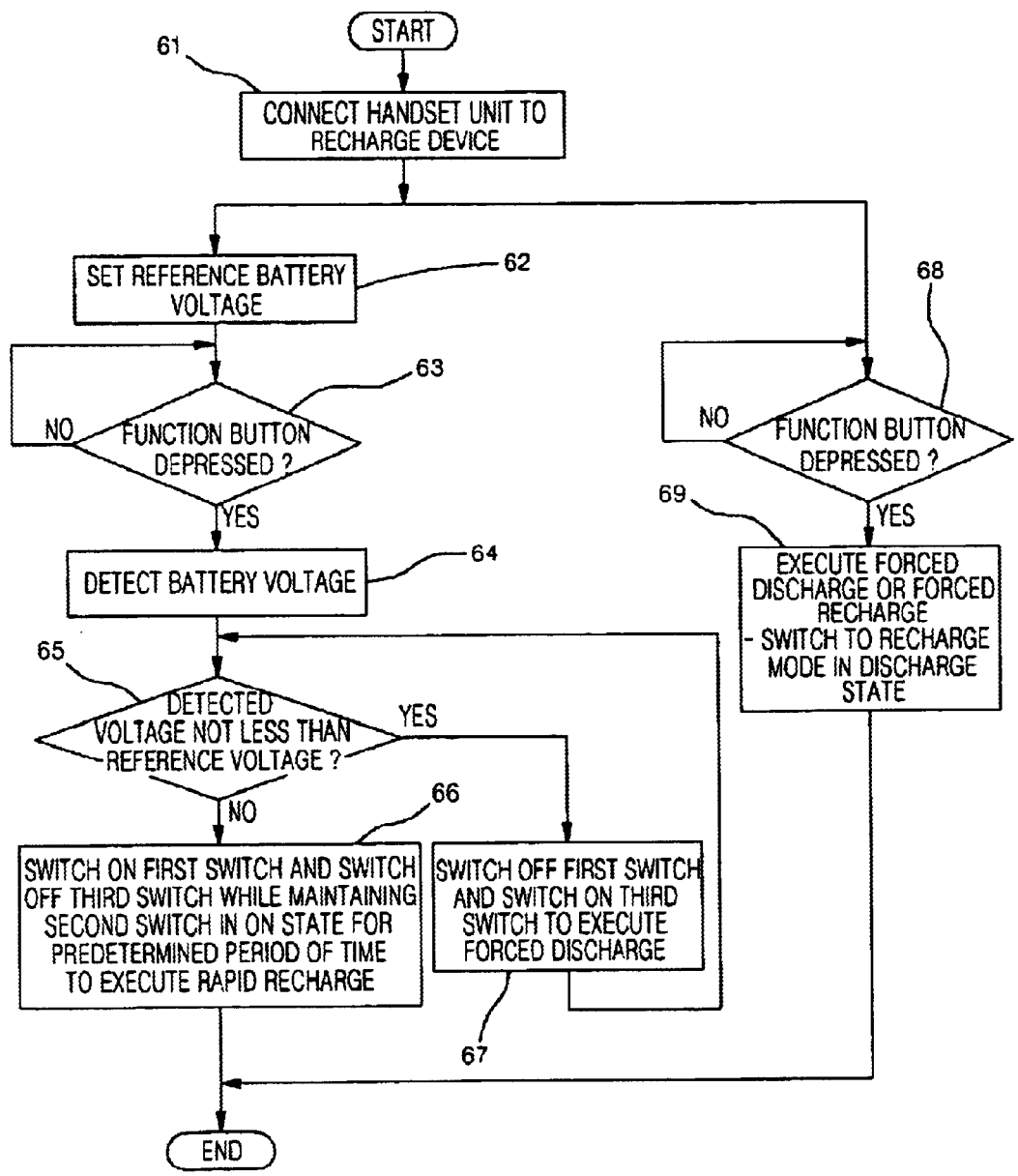
FIG. 5 is a flow chart illustrating a battery capacity recovery method associated with the battery capacity recovery apparatus of FIG. 2.

Now, the above mentioned battery capacity recovery apparatus and method will be described in detail, in conjunction with respective embodiments of the present invention. A description will be first made in conjunction with FIG. 5 which is a flow chart illustrating a battery capacity recovery procedure associated with the battery capacity recovery apparatus of FIG. 2.

The user first connects the handset unit to the recharge device (Step 61), and then sets a reference voltage by a minimum voltage within a voltage range having no influence on the battery (Step 62). Thereafter, the user depresses a function button provided at the handset unit for the execution of a battery capacity recovery operation, so as to allow the battery capacity recovery apparatus to conduct the battery capacity recovery operation.

In response to a button input, the control unit 40 then determines whether or not the function button is depressed (Step 63). When the control unit 40 determines that the function button is depressed, it then determines whether or not the handset unit is in a recharge state, based on a detect signal received from the recharge detecting unit 20 (Step 64). When the control unit 40 determines that the handset unit is in the recharge state, it is then determined whether or not the battery voltage detected by the voltage detecting unit 30 is not less than the reference voltage (Step 65).

When the detected battery voltage is less than the reference voltage, the control unit 40 switches on the first switch 51 and the second switch 52 to execute a rapid recharge mode (Step 66) for a predetermined period of time, the second switch is turned off. Thereafter, in this regular recharge mode, the battery is recharged via the recharge current control resistor because the handset unit is in a state connected to the constant voltage generating unit 10 of the recharge device via the recharge terminals, and the first switch 51 is in its ON state.

On the other hand, where the detected battery voltage is not less than the reference voltage, the control unit 40 switches off the first switch 51 while switching on the third switch 53, thereby executing a forced discharge mode (Step 67). In the forced discharge mode, the control unit 40 frequently checks the voltage condition of the battery, based on a signal received from the voltage detecting unit 30. If the detected battery voltage is reduced to be less than the reference voltage, the control unit 40 switches on the first switch 51 while switching off the third switch 53, thereby switching the operation mode from the forced discharge mode to the rapid and/or regular recharge mode.

In the rapid recharge mode, the second the second switch 52 is switched on, and maintained in the ON state for a predetermined period of time. Accordingly, an initial rapid recharge operation is conducted for the predetermined period of time in order to minimize a possible inconvenience of the user caused by a discharge of the battery.

Alternatively, forced discharge or forced recharge operations of the battery may be carried out just after the user depresses the function button for the execution of the battery capacity recovery operation (Step 68 and 69). In this case, the forced discharge operation is carried out after completion of the recharge operation. These forced discharge and recharge operations are carried out in the same fashion as those of step 45 and 46.

The embodiment of FIG. 2 is implemented using the function button of the keypad 80 which can be depressed by the user. Such a configuration is based on an assumption that may be necessary to carry out the battery capacity recovery function once per one month in the case of batteries currently used.

Figure 6:
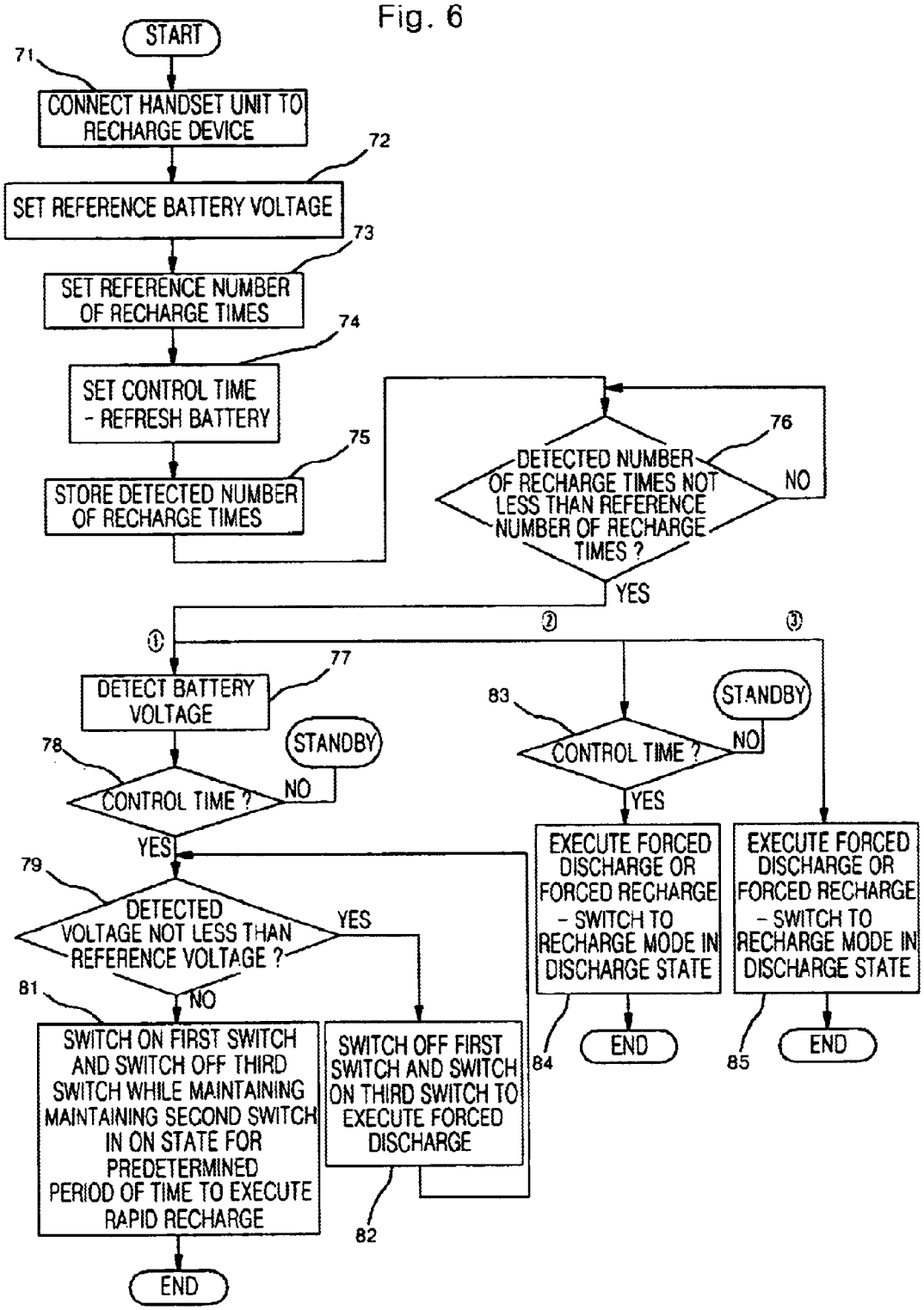
FIG. 6 is a flow chart illustrating a battery capacity recovery method associated with the battery capacity recovery apparatus of FIG. 3.

FIG. 6 is a flow chart illustrating a battery capacity recovery procedure associated with the battery capacity recovery apparatus of FIG. 3. The user first connects the handset unit to the recharge device (Step 71), and then sets a reference voltage by a minimum voltage within a voltage range having no influence on the battery (Step 72). Thereafter, the user sets a reference number of recharge times and a control time for the execution of a battery capacity recovery operation (Steps 73 and 74).

When the user puts the handset unit on the recharge device, the control unit 40 then determines whether or not the handset unit is connected to the recharge device, i.e., whether or not the handset unit is in a recharge state, based on a signal received from the recharge detecting unit 20. When it is determined that the handset unit is in the recharge state, the control unit 40 cumulatively stores the counted number of recharge times in the register unit 60, thereby updating the counted number of recharge times (Step 75). Thereafter, the control unit 40 determines whether or not the counted number of recharge times is not less than the reference number of recharge times (Step 76).

Where it is determined that the counted number of recharge times is not less than the reference number of recharge times, the control unit 40 checks the battery voltage detected by the voltage detecting unit 30 (Step 77). Following step 77, the control unit 40 determines whether or not the current time reaches the control time for the execution of the battery capacity recovery operation (Step 78).

The control unit 40 continuously checks the current time, based on a signal received from the clock unit 70. When the current time corresponds to the control time, the battery capacity recovery operation is executed. On the other hand, when the current time does not reach the control time, the control unit 40 is rendered to be in a standby mode. The control time may be set by a time, at which the telephone is almost unused, for example, during night time. The user may conduct setting of the current time and the control time, that is, the reference recovery time, for example, when the telephone is initially installed.

Where the current time corresponds to the control time, the control unit 40 determines whether or not the detected battery voltage is less than the reference voltage (Step 79). When the detected battery voltage is not less than the reference voltage, the control unit 40 switches off the first switch 51 while switching on the third switch 53, thereby connecting the battery to the ground. As a result, the forced discharge path is established to execute a forced discharge operation (Step 82).

The forced discharge operation is continued until the battery voltage is reduced to a level less than the reference voltage, i.e., the minimum voltage within a voltage range having no influence on the battery. In response to a reduction of the battery voltage to a level less than the reference voltage, the control unit 40 switches on the first switch 51 while switching off the third switch 53, thereby establishing the recharge path between the first switch 51 and the battery. In this state, the second switch 52 is also switched on, and maintained in the on state for a predetermined period of time. Accordingly, an initial rapid recharge operation is conducted for the predetermined period of time.

On the other hand, when the detected battery voltage is less than the reference voltage, the control unit 40 switches on the first switch 51 while switching off the third switch 53, thereby establishing the recharge path between the first switch 51 and the battery. In this state, the second switch 52 is also switched on, and maintained in the on state for a predetermined period of time. Accordingly, an initial rapid recharge operation is conducted for the predetermined period of time (Step 81). After the rapid recharge operation is completed as the second switch 52 is switched off, a normal recharge operation is conducted through the recharge path established via the first switch 51 and the resistor. After completing step 81, the procedure is ended.

Alternatively, forced discharge or forced recharge operations of the battery may be carried out, only based on the fact that the counted number of recharge times is not less than the reference number of recharge times (Step 85). Furthermore, the forced discharge and recharge operations may be conducted after determining whether or not the current time corresponds to the control time (Steps 83 and 84). In this case, the forced discharge operation is carried out after completion of the recharge operation. These forced discharge and recharge operations are carried out in the same fashion as those of step 45 and 46, is described with reference to FIG. 4.

As apparent from the above description, the battery capacity recovery apparatus of the present invention is incorporated in a telecommunication device, so that it can prevent a memory effect more frequently resulting in a battery degradation, as compared to those resulting from other factors. In accordance with the battery recovery apparatus and method of the present invention, discharge and recharge operations are carried out by checking signals outputted from the voltage detecting unit and recharge detecting unit, and depressing the function button for the execution of a battery capacity recovery operation in accordance with a manipulation made by the user when the output signals are less than and not less than reference values, respectively. The discharge and recharge operations may be automatically conducted, based on the result of a comparison of the output signals with respective reference values. Accordingly, it is possible to reduce the battery degradation while maximizing the convenience of the user.

Although the preferred embodiments of the invention have been disclosed for illustrative purposes, those skilled in the art will appreciate that various modifications, additions and substitutions are possible, without departing from the scope and spirit of the invention as disclosed in the accompanying claims. Although the switches for forced discharge and recharge operations are incorporated in the handset unit of the wireless telephone, they may be alternatively incorporated in the recharge device. The present invention may also be applied not only to a telecommunication device, but also to any devices, apparatus or systems using rechargeable batteries (in particular, those of the NiCd type).

What is claimed is:

1. A battery capacity recovery method, comprising:
    setting a reference voltage for a battery of an electronic device;
    connecting the electronic device containing the battery to a recharge device;
    detecting a voltage of the battery;
    determining whether the detected battery voltage lies within a range between the reference voltage and a recharge voltage; and
    discharging the battery if the detected battery voltage lies within said range.

2. The battery capacity recovery method according to claim 1, wherein the reference voltage is a predetermined minimum voltage.

3. The battery capacity recovery method according to claim 1, further comprising:
recharging the battery when the detected battery voltage is less than the reference voltage.

4. The battery capacity recovery method according to claim 1, wherein discharging the battery comprises:
switching off a first switch adapted to establish a recharge path between recharge terminals and the battery; and
switching on a third switch adapted to establish a discharge path between the battery and a ground.

5. The battery capacity recovery method according to claim 4, further comprising:
detecting a voltage of the battery after discharging the battery;
comparing the detected battery voltage after discharging with the reference voltage; and
recharging the battery when the detected battery voltage after discharging is less than the reference voltage.

6. The battery capacity recovery method according to claim 5, wherein recharging the battery comprises:
switching on the first switch when the detected battery voltage lies within said range, while switching off the third switch.

7. A battery capacity recovery method, comprising:
setting a reference voltage for a battery of an electronic device;
connecting the electronic device containing the battery to a recharge device;
detecting a voltage of the battery;
determining whether the detected battery voltage is not less than the reference voltage; and
switching on a switch which establishes a rapid recharge path to the battery, for a predetermined period of time when the detected battery voltage is less than the reference voltage, thereby executing a rapid recharge operation.

8. A battery capacity recovery method, comprising:
setting a reference voltage for a battery of an electronic device;
connecting the electronic device containing the battery to a recharge device;
comparing a current time of day to a predetermined time of day; and
performing an operation for recovering a capacity of the battery based on a result of the comparing step.

9. A battery capacity recovery method, comprising:
connecting an electronic device containing a battery to a recharge device;
detecting activation of a function key on the electronic device by a user;
determining whether a voltage of the battery is equal to or greater than a reference voltage in response to detection of the function key activation; and
discharging the battery when it is determined that the battery voltage is equal to or greater than a reference voltage.

10. A battery capacity recovery method, comprising:
setting a reference voltage for a battery of an electronic device;
connecting an electronic device containing the battery to a recharge device;
setting a reference number of recharge times;
storing a detected number of recharge times;
comparing the detected number of recharge times to the reference number of recharge times;
comparing a current time to a predetermined control time; and
performing a battery capacity recovery operation based on results of the comparing steps.

11. The battery capacity recovery method according to claim 10, further comprising: receiving information from a user setting the predetermined control time.

12. The battery capacity recovery method according to claim 10, wherein the performing step includes:
performing the battery capacity recovery operation when the stored detected number of recharge times is not less than the reference number of recharge times the current time corresponds to the predetermined control time.

13. The battery capacity recovery method according to claim 10, further comprising:
comparing the current time to the predetermined control time when the stored detected number of recharge times is not less than the reference number of recharge times; and
executing a recharge or discharge operation for the battery when the current time corresponds to the control time.

14. The battery capacity recovery method according to claim 1, wherein the electronic device is a mobile telephone.

15. The battery capacity recovery method according to claim 1, wherein the electronic device is a cordless telephone.

16. The battery capacity recovery method according to claim 1, wherein the detecting, determining, and discharging steps are performed in the electronic device.

17. The battery capacity recovery method according to claim 2, wherein the predetermined minimum voltage corresponds to a voltage insufficient for powering the electronic device.

18. The battery capacity recovery method according to claim 2, wherein the predetermined minimum voltage is a voltage within a range capable of preventing the battery from being adversely influenced when the battery is excessively discharged.

19. The battery capacity recovery method according to claim 1, further comprising:
recharging the battery after discharging, said recharging including performing a rapid recharge operation for a predetermined period of time.

20. The battery capacity recovery method according to claim 1, further comprising:
recharging the battery at a first rate for a predetermined period of time; and
recharging the battery at a second rate after said predetermined period of time expires, wherein the recharging steps are performed after the discharging step and wherein the first rate is greater than the second rate.

21. The battery capacity recovery method according to claim 20, further comprising:
detecting the battery voltage during discharging; and
comparing the battery voltage detected during discharging to the reference value, wherein discharging is stopped and the recharging steps are performed if the battery voltage is less than the reference voltage.

22. The battery capacity recovery method according to claim 8, wherein the predetermined time of day is night.

23. The battery capacity recovery method according to claim 8, wherein performing the battery capacity recovery operation includes:

discharging the battery until a voltage of the battery is below a reference voltage; and recharging the battery after discharging.

24. The battery capacity recovery method according to claim 23, wherein recharging the battery includes:

performing a rapid recharge operation for a predetermined period of time.

25. The battery capacity recovery method according to claim 24, wherein recharging the battery includes:

recharging the battery at a first rate for a predetermined period of time; and recharging the battery at a second rate after said predetermined period of time expires, wherein the first rate is greater than the second rate.

26. The battery capacity recovery method according to claim 9, recharging the battery after discharging, said recharging including performing a rapid recharge operation for a predetermined period of time.

27. The battery capacity recovery method according to claim 9, further comprising:

recharging the battery at a first rate for a predetermined period of time; and recharging the battery at a second rate after said predetermined period of time expires, wherein the recharging steps are performed after the discharging step and wherein the first rate is greater than the second rate.

28. The battery capacity recovery method according to claim 27, further comprising:

detecting the battery voltage during discharging, and comparing the battery voltage detected during discharging to the reference value, wherein discharging is stopped and the recharging steps are performed if the battery voltage is less than the reference voltage.

29. The battery capacity recovery method according to claim 18, wherein the predetermined control time is a time of day.

30. The battery capacity recovery method according to claim 29, wherein the time of day is night.

31. A battery capacity recovery method, comprising:

detecting a voltage of a battery;

determining whether the voltage lies within a range between a reference voltage and a recharge voltage; and discharging the battery if the detected battery voltage lies within said range.

32. The battery capacity recovery method according to claim 31, further comprising:

connecting an electronic device containing the battery to a recharger, said detecting, determining, and discharging steps being performed in the electronic device.

33. The battery capacity recovery method according to claim 31, further comprising:

recharging the battery at a first rate for a predetermined period of time; and recharging the battery at a second rate after said predetermined period of time expires, wherein the recharging steps are performed after the discharging step and wherein the first rate is greater than the second rate.

* * * * *